United States Patent [19]

Wakui et al.

[11] 4,261,291
[45] Apr. 14, 1981

[54] MILK TAP DEVICE FOR MILKING MACHINE

[75] Inventors: Akio Wakui, Takayama; Kiyoji Matsumoto, Nagano, both of Japan

[73] Assignee: Orion Machinery Co. Ltd., Nagano, Japan

[21] Appl. No.: 105,601

[22] Filed: Dec. 20, 1979

[51] Int. Cl.³ ............................................. A01J 5/00
[52] U.S. Cl. ................................ 119/14.01; 251/149.1
[58] Field of Search ..................... 119/14.01; 138/114; 251/149.1, 146

[56] References Cited

U.S. PATENT DOCUMENTS 4,114,565  9/1978  Dodé et al. ........................ 119/14.01

Primary Examiner—Hugh R. Chamblee
Attorney, Agent, or Firm—Toren, McGeady and Stanger

[57] ABSTRACT

A milking machine tap assembly for connecting a teat cup unit with a vacuum pipe and a milk pipe extending within the vacuum pipe. A tap box unit is provided which has a housing with a window opening in its side wall, and two axially aligned connecting tubes at opposite ends of the housing to connect with confronting sections of the vacuum pipe. A tubular milk tap body within the housing has its ends arranged to connect with confronting sections of the milk pipe, the tap body also having a first port through its side wall to enable the teat cup unit to communicate with the milk pipe through the tap body. A tap frame is fixed to the housing over the window opening to position the first port. An air packing is mounted on the frame and cooperates therewith to form a second port which enables the teat cup unit to communicate with the vacuum pipe through the housing interior. A gate is slidably mounted to the frame for simultaneously closing the first and second ports.

6 Claims, 8 Drawing Figures

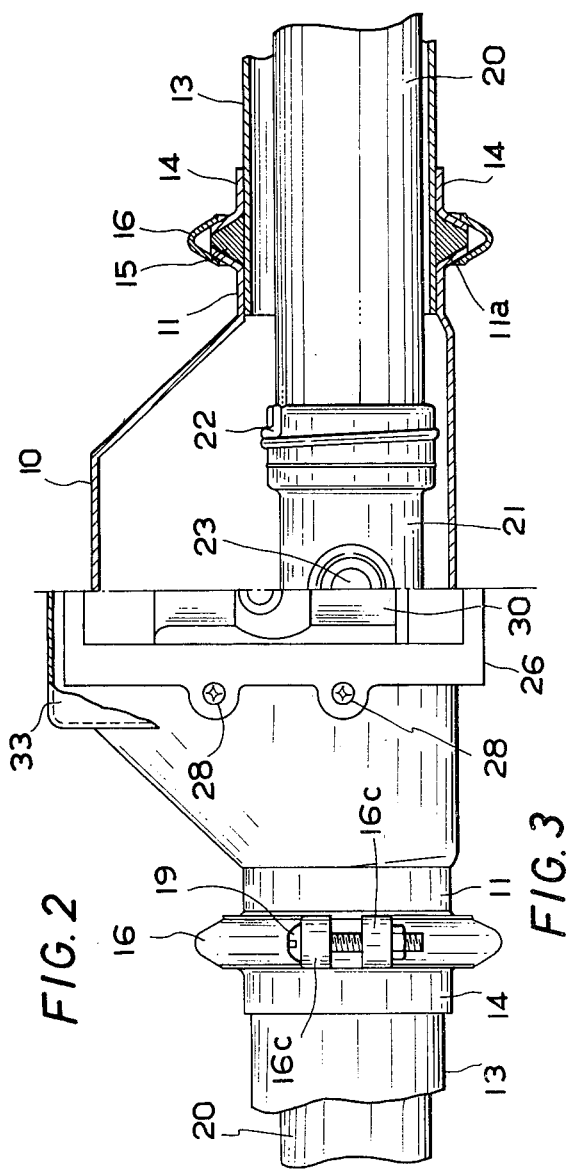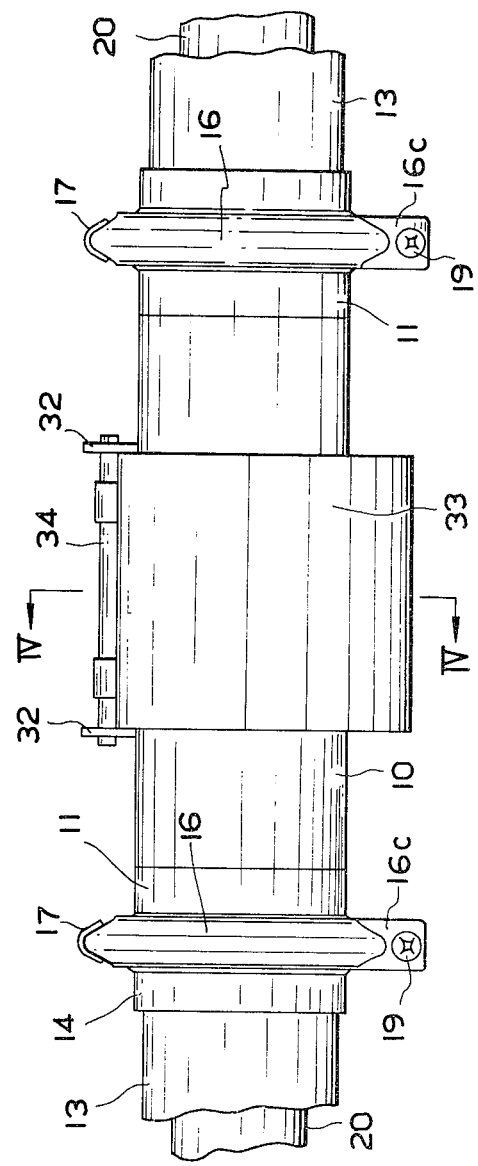

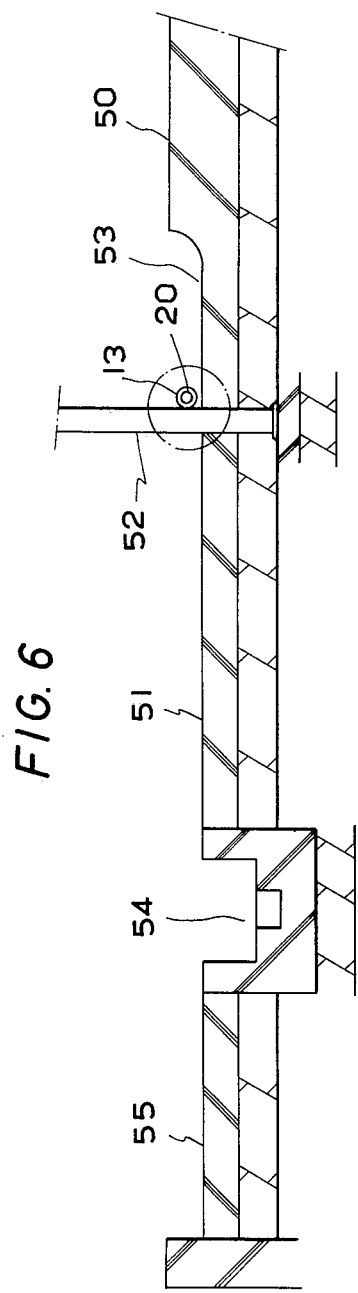
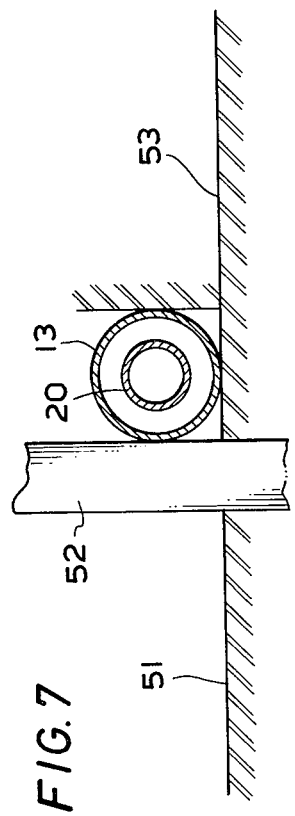

MILK TAP DEVICE FOR MILKING MACHINE

BACKGROUND OF THE INVENTION

The present invention relates generally to a milk tap assembly in a milking machine system, and particularly to a milk tap assembly for joining a teat cup unit to a system wherein a milk pipe is provided within a vacuum pipe.

Milking machine system of conventional design are constructed in such a way that milk and vacuum pipes are positioned about 1.5 meters above and parallel to the floor. This arrangement was intended mainly to protect milk pipes made of the glass from being kicked and destroyed by cows. However, with such a difference in height between the milk pipe and a teat cup unit affixed to the cow, vacuum pressure in milk lines associated with the teat cup unit changes as the milking operation proceeds. Thus, the vaccum pressure applied to the cow's teats changes every time the milk is sucked, and causes congestion about the teats or mastitides from the strong stimuli applied upon the lactic glandular cells. The conventional milk machine system generally is arranged as shown in FIG. 8 of the accompanying drawing, wherein a milk pipe 1 and a vaccum pipe 2 are positioned parallel to the floor and provided with a given number of tap boxes 3. A milk tube 4 is affixed to the box 3 at one end, and is connected at its other end with a milk claw 5 having a number of teat cups 6. A pulsator 7 is fixed to the tap box 3, and is interconnected with the vacuum pipe 2. Pulsator 7 and teat cup 6 are joined with a vacuum tube 8. In accordance with this construction, the milk tube 4 extends for a height H between the milk claw 5 of the teat cup 6 and the milk pipe 1 which transfers the milk. Thus, milk is not sucked immediately after attachment of the teat cups 6 to the teats. The vacuum in the milk pipe 1 works directly upon the teats via the milk tube 4 and the milk claw 5. When milk starts to flow out of the teats, passes through the milk claw 5 and begins to fill the milk tube 4, there arises a loss in vacuum when the milk tube 4 becomes completely filled with milk because of the height H of the tube. This acts to decrease the vacuum applied upon the teats of the cows. When the milking operation is over and no more milk is drawn into the teat cups, the vacuum then works on the teats in the same manner as when the operation began. Thus, the vacuum working on the teats changes from high to low and then again to high levels. A bleeder-hole is provided in the milk claw 5 to facilitate a smooth flow of milk by allowing air to enter into the milk tube 4 to prevent the tube from becoming overly full with milk. In the case where the height from the milk calw 5 to the milk pipe 1 is 1.5 meters, the vacuum within the milk pipe 1 is usually 380 mm Hg. However, when the milk tube 4 is filled with milk, there will be a loss of about 110 mm Hg so that the vacuum working on the teats decreases to 270 mm Hg. In this manner, the vacuum changes from 380 to 270, and back to 380 mm Hg during the milking operation. If these variations continue, the area around the teats will become congested and the orifice of the lactic canal will project and turn outwardly, thereby increasing susceptibility to germs and to sicknesses.

An object of the present invention is to obviate the above defects in the prior milking machines and to prevent injuries to the teats of milking cows.

In accordance with the present invention, a milking machine tap arrangement for connecting a teat cup unit with a milk pipe and a vacuum pipe comprises a tap box unit including a housing having a window opening in an axially extending side wall, and two axially aligned connecting tubes extending from opposite ends of the housing for providing air tight connections with axially spaced sections of a vacuum pipe. A tubular tap body is located within the housing and has its axially spaced ends connected with axially spaced sections of milk pipe which extends within the vaccum pipe. A first port is arranged on the side wall of the tap body to allow communication with the milk pipe through the tap body, the first port facing the window opening. A tap frame is fixed to the housing over the window opening, and an air packing is mounted to the tap frame to form a second port which allows communication with the vacuum pipe through the interior of the housing. A gate is slidably mounted to the frame for simultaneously closing the first and second ports.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an enlarged, partially broken and partly sectional side view of the assembled tap arrangement of FIG. 1;

FIG. 3 is an enlarged, plan view of the assembled tap arrangement of FIG. 1;

FIG. 6 is a sectional view of a cow barn floor illustrating an arrangement of vacuum and milk pipes relative to the floor according to the present invention;

FIG. 7 is an enlarged sectional view of the vacuum and milk pipes in FIG. 6.

DETAILED DESCRIPTION OF THE INVENTION

Figure 1:
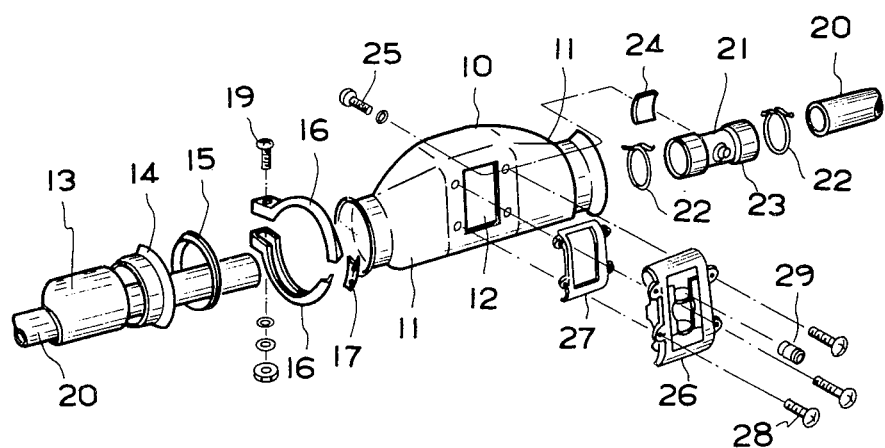
FIG. 1 is a perspective exploded view of a milking machine tap assembly in accordance with the present invention, showing the component members thereof.

Referring to FIGS. 1 to 3, a tap box unit includes a housing 10 and a pair of axially aligned connecting cylinders or tubes 11 extending from opposite ends and forming a part of the housing. A window 12 is also provided in an axially extending side wall of the housing, the window facing in a transverse direction relative to the axis of the tubes 11. Flanges 11a are formed at the ends of tubes 11, the flanges tapering outwardly to form openings of larger diameter than that of the tube bodies.

A steel vacuum pipe 13 included a pair of axially aligned, spaced pipe sections is joined to the tubes 11 of the unit housing 10. A pair of metal sleeves 14 having flanged ends of identical cross section to the flanges 11a are placed over the vacuum pipe sections, and the vacuum pipe sections are inserted into the tubes 11. Packings 15 are located about the sections between the tube flanges 11a and the flanges of sleeves 14, and notched bands 16 are tightened over confronting flanges (FIG. 2). Before inserting the vacuum pipe sections into the tubes 11 of the unit housing 10 and tightening the bands 16, the flanged sleeves 14, packings 15 and bands 16 preferably should be inserted over the vacuum pipe sections.

Figure 5:
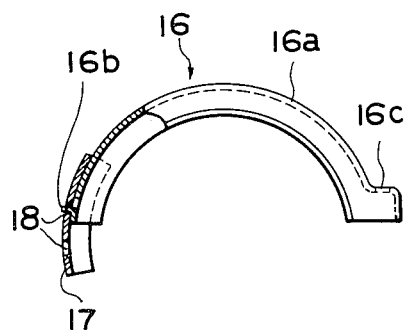
FIG. 5 is a partially broken side view of a V-notched band used in the milking machine tap arrangement of the present invention.

The V-notched bands 16 have a V-shaped cross section, and each of them includes a pair of semi-circular band members 16a, as shown in FIG. 5. Projections 16b extend radially outwardly at one end of each band member 16a, and end clamps, 16c are formed at the other end of each band member 16a. The V-notched bands 16 are assembled by selecting two band members 16a, and a connecting plate 17 having a pair of holes 18 therein for engaging the projections 16b of the band members 16a. Screws 19 extend through the end clamps 16c of the band members thereby enabling the housing 10 to be fixedly joined with the vacuum pipe sections when the screws 19 are tightened.

Figure 4:
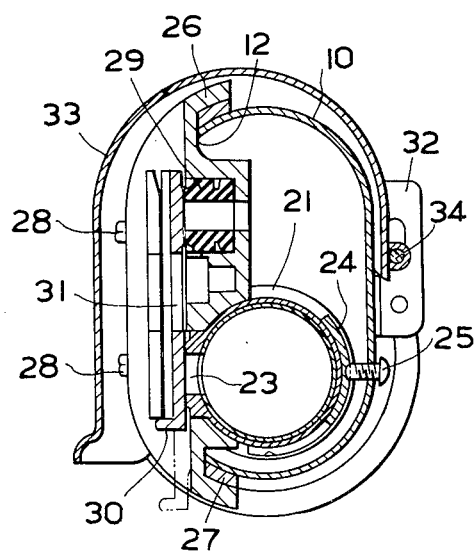
FIG. 4 is a cross-sectional view taken along line IV—IV in FIG. 3.
Figure 8:
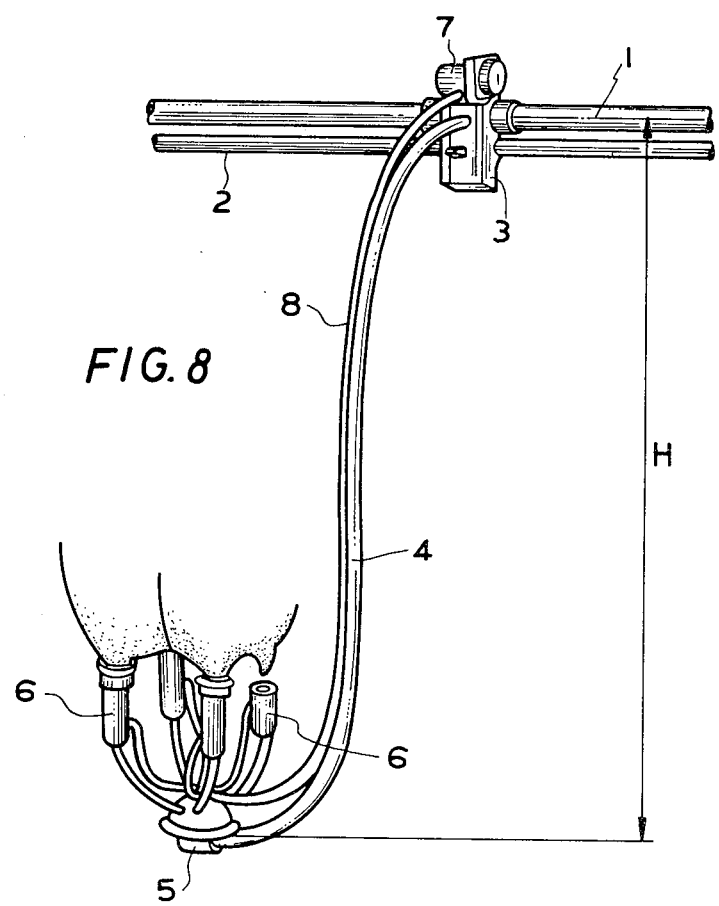
FIG. 8 is a perspective view of a conventional milking machine arrangement during a milking operation.

A milk pipe 20 extends within the vacuum pipe 13, the milk pipe being made of glass and including a pair of axially aligned spaced pipe sections. A rubber tubular milk tap body 21 has its axially spaced ends joined to the sections of the milk pipe by way of ring bands 22 at the joints. A port 23 extends through the side wall of the tap body 21 intermediate the ends of the body for allowing a teat cup unit (not shown) to be connected with the tap body. As shown in FIG. 4, a tap adjusting metal plate 24 is located against the outside of the tap body 21 opposite the port 23. Milk tap body 21 preferably is placed inside the tap housing 10 prior to connection of the vacuum pipe sections to the connecting tubes 11. Once placed inside the housing 10, the milk tap body 21 is joined to the milk pipe sections and fixed thereto by the ring bands 22. The port 23 in the milk tap body 21 is positioned to face toward the window 12 of the housing 10, and an adjustment screw member 25 is screwed into the wall of the housing 10 behind the tap body 21 to engage the adjusting plate 24 and securely fix the milk tap body 21 within the housing 10.

A tap base or frame 26 is fixed over the window 12 of the tap housing 10 by screws 28, a packing seal 27 being provided between frame 26 and housing 10. The milk tap body 21 is accurately positioned relative to the frame 26. The tap frame 26 and the tap body 21 are securely fixed by the screw 25 as it is screwed into the rear wall of the tap housing 10.

An annular air packing 29 is mounted to the tap frame 26 so that the front of the packing 29 is in the same plane as the front of the port 23 in the milk tap body 21. Packing 29 forms, in combination with the frame 26, a second port which communicates with the interior of the housing 10. A sliding gate 30 is mounted to frame 26 for simultaneously closing the port of the air packing 29 and the port 23 of the tap body 21. It will be understood that port 23 of the tap body 21, and the port of the air packing 29 on the tap frame 26, communicate with the milk and vacuum pipes through the tap body 21 and the interior of the housing 10, respectively. An opening 31 is also provided in the sliding gate 30 for enabling the teat cup unit (not shown) to be connected with both ports.

Since the teat cup unit is attached to the tap box unit only during a milking operation, a cover 33 is provided to protect the tap box unit from dust and the like. Cover 33 is sufficiently large to cover a substantial portion of the unit housing 10, and is mounted to the housing 10 for pivotal movement by means of a bearing plate 32 provided on the rear wall of the housing 10, and a pin 34. Cover 33 is pivoted upwardly during the milking operation, but at other times it is allowed to cover the housing 10 as shown in FIGS. 3 and 4. When milking cows, cover 33 is pivoted upwardly and the teat cup unit is attached to the ports of the tap box unit.

Although there are various types of cow sheds or milking barns, the most conventional have spaced partitions for housing one cow in each defined stall, and passages running in front of and behind the cows. In one type of barn, cow beds or pallets are provided on both sides of a passage. FIG. 6 shows a type of cow barn where pallets 51 are provided on both sides of a center passage 50, although the drawing only shows one of the two rows of pallets 51.

The pallet 51 is on a plane somewhat lower than that of the center passage 50, and a feed box 53 is formed on the side closer to the center passage by means of a low wall 52, while on the opposite side of the feed box 53 is provided a trough 54 for manure, as well as the side passage 55. A vacuum pipe with a milk pipe therein is preferably located close to the low wall 52 of the feed box 53. The diameters of the vacuum pipe 13 and the milk pipe 20 are preferably 64.5 mm and 50 mm, respectively, and the center of the vacuum pipe 13 is at a height of about 60 mm over the floor. At locations where the pipes cross the center passage 50 and the side passage 55, it is preferable to provide a groove deep enough to contain the pipes so that the passages remain at uniform levels.

When milking cows with the arrangement of the present invention, cover 33 is pivoted open, sliding gate 30 is pulled down to expose the air packing 29 and the tap body port 23, and a pulsation tube of a teat cup (not shown) and associated milk tube are respectively connected to the port of the air packing 29 and the port 23. The pulsation tube connected with the air packing 29 communicates with the vacuum pipe 13 via the unit housing 10, whereas the milk tube communicates with the milk pipe 20 by way of the tubular milk tap body 21.

Inasmuch as the vacuum pipe 13 is connected to a vacuum generating device, and the milk pipe 20 to a milk processing plant, vacuum pressure and atmospheric pressure are alternatingly supplied to the teat cup unit by a pulsator attached to the teat cup unit, so that milk sucked through the teat cup unit when attached to the teats is sent to the milk processing plant through the milk pipe 20. The provision of a tap box unit and a dual pipe arrangement in accordance with the present invention facilitates locating the tap box unit at a position as close to the floor of a cow barn as possible, thereby eliminating differences of height between the teat cup unit and the tap box unit with its associated pipes. This arrangement avoids changes in vacuum applied to the cow's teats during a milking operation, and thereby prevents injury to the teats.

While specific embodiments of the invention have been shown and described in detail to illustrate the application of the inventive principles, it will be understood that the invention may be embodied otherwise without departing from such principles.

What is claimed is:

1. A milking machine tap assembly for connecting a teat cup unit with a milk pipe and a vacuum pipe comprising a milk pipe including a pair of axially aligned, spaced milk pipe sections for conveying milk from the unit, a vacuum pipe arranged to enclose said milk pipe and including a pair of axially aligned spaced vacuum pipe sections for supplying a vacuum to the unit, and a tap box unit including a tap housing having an axially extending wall with a window opening therein and two axially aligned connecting tubes extending from opposite ends and forming a part of said housing for providing air tight connections with said vacuum pipe sections, a tubular tap body within said housing having axially spaced ends thereof connected with said milk pipe sections, a first port arranged in the wall of said tap body intermediate the ends of said body to enable the teat cup unit to communicate with said milk pipe through said tap body, said first port facing said window opening, a tap frame fixed to said housing over said window opening, an air packing mounted to said tap frame and forming in combination with said frame a second port to enable the teat cup unit to communicate with said vacuum pipe through the interior of said housing, and a gate slidably mounted in said frame for simultaneously closing said first and second ports.

2. A milking machine tap assembly according to claim 1, including a tap adjusting plate arranged outside said tubular milk tap body on the opposite side thereof with respect to said first port, and an adjustment screw member extending through said housing for engaging said plate to secure said tap body within said housing.

3. A milking machine tap assembly according to claim 1, including a cover plate pivotally mounted on said housing for covering said tap frame.

4. A milking machine tap assembly according to claim 1, including a pair of sleeves each having a flange at one end thereof, said sleeves surrounding said confronting ends of said vacuum pipe so that said sleeve flanges face toward said tap housing, each of said connecting tubes having a corresponding flange formed at the end thereof which faces toward one of said sleeve flanges, packing rings located outside of said vacuum pipe sections between said connecting tube flanges and said sleeve flanges, and V-notched bands for clamping said sleeve and tube flanges against said packing rings.

5. A milking machine tap assembly according to claim 4, wherein said bands comprise semi-circular band members each having a projection extending radially outwardly at one end and a clamping member arranged at the other end thereof, and including connecting plates having openings therein for engaging the projections on said band members, and screw members for engaging said clamping members so that two band members can be connected together by one of said plates and clamped about said sleeve and tube flanges by tightening one of said screw members.

6. A milking machine tap assembly according to claim 1, including a cow stall and means for positioning said vacuum pipe with said milk pipe therein substantially close to the floor of said stall, and a number of said tap box units connected to a corresponding number of said vacuum and milk pipe sections, said tap box units being spaced apart from each other by a desired amount.

* * * * *